United States Patent Office 3,472,882
Patented Oct. 14, 1969

3,472,882
7-HALOMETHYL-19-NOR STEROIDS AND PROCESSES FOR THEIR PREPARATION
Belig Berkoz, Los Altos, Calif., assignor to Syntex Corporation, Panama, Panama
No Drawing. Filed Dec. 14, 1966, Ser. No. 601,572
Int. Cl. C07c *169/04, 169/10;* A61k *27/00*
U.S. Cl. 260—397.3                  11 Claims

ABSTRACT OF THE DISCLOSURE

Disclosed is a process for preparing 7α-(mono and di) halomethyl-19-nor steroids, particularly those of the androstane class. This process proceeds by adding a 6,7-halomethylene group across the Δ⁶ double bond of a 19-acetoxy-Δ⁴,⁶ compound with an alkali or alkaline earth metal salt of a halo acid followed by the ring opening of said halomethylene group to provide the corresponding 7α-(mono or di)halomethyl-19-hydroxy-Δ⁴ compound. This derivative is then oxidized to form the corresponding 19-carboxylic acid compound and this acid then decarboxylated to provide the 7α-(mono or di)halomethyl-19-nor products. These products have been described as active anabolic agents.

---

This invention relates to a method for the preparation of cyclopentanophenanthrene derivatives.

More particularly, the present invention pertains to the preparation of 7α-halomethyl-19-nor steroids, and, specifically, 7α-halomethyl-19-norandrostanes, including both the monohalo and dihalo derivatives thereof.

In copending application Ser. No. 513,548, filed Dec. 13, 1965, now U.S. Patent No. 3,357,973 there is described a process for preparing 7α-halomethylandrostanes, which are active anabolic agents, by cleaving a holcyclopropyl group fused to adjacent carbons 6 and 7 in the steroid nucleus, i.e., a 6,7-halomethylene group, with reagents which effect such ring opening. While this process is applicable to both androstanes and 19-norandrostanes, the 19-nor compounds are not as responsive to the ring opening procedure as the corresponding 6,7-halomethylene compounds containing a C–10 angular methyl group. Thus, the process therein described is not as effective when performed on steroids of the 19-nor series.

A process has now been discovered which avoids the aforementioned disadvantages. By virtue of the process of the present invention, it is now possible to effectively prepare 19-norandrostane steroids containing a 7-halomethyl group which group is derived from the antecedent 6,7-halomethylene function upon ring opening. The present process is thus particularly applicable to the preparation of 7-monohalomethyl and 7-dihalomethyl steroids in the 19-nor series.

The novel chemical transformation sequence of the present invention is represented as follows.

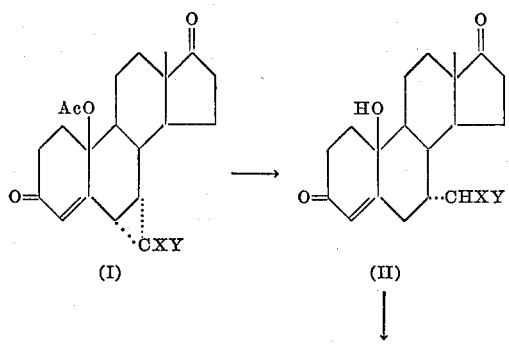

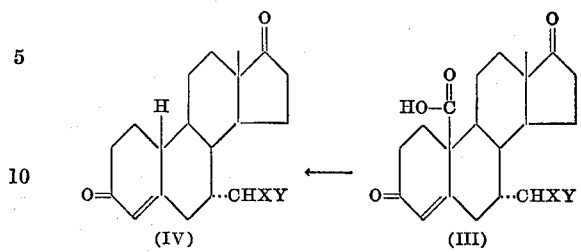

In the above reaction sequence, Ac represents acyl, preferably, acetyl, X represents hydrogen, chloro, or fluoro, and Y represents chloro or fluoro. The product compound (IV) hereof exhibits anabolic activity and is thus useful.

Following the above depicted reaction sequence in more detail, the starting compound 6,7-halomethylene-19-acyloxyandrost-4-ene-3,17-dione (I) is provided upon treatment of the corresponding 19-acyloxyandrosta-4,6-diene-3,17-dione, preferably the 19-acetoxy derivative thereof (prepared, for example, according to the procedure set forth in United States Patent 3,211,761, issued October 12, 1965), with a molar excess of an alkali or alkaline earth metal salt of a haloacid having the formula:

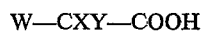

W—CXY—COOH in which W is chloro, iodo, or bromo, X is hydrogen, chloro, or fluoro, and Y is chloro or fluoro in inert, non-aqueous solvent at temperatures above the decomposition temperature of the particular salt employed. Suitable acids thus useful include trichloroacetic, bromodichloroacetic, chlorodifluoroacetic, chlorofluoroacetic, and the like. Addition occurs exclusively or predominantly across the Δ⁶ double bond, the configuration being generally a mixture of alpha and beta with alpha predominating.

The ring opening of the thus prepared 6,7-halomethylene compound (I) is conducted in organic liquid medium at temperatures ranging from room temperature (about 25° C.) to 150° C. or more, preferably at atmospheric pressure, and for varying duration (usually at least 30 minutes and more) with reagents which effect such ring opening including zinc dust in commercial form such as activated (acid-washed) and amalgam combinations, for example, a zinc-copper metal couple, in inert solvent such as is provided by a (lower)carboxylic acid, e.g., acetic, propionic, butyric, and the like; an organic alcohol, e.g., methanol, ethanol, propanol, and the like; and glycol-water mixtures, e.g., ethylene glycol-water mixture and the like to give the ring opened 7-halomethylandrostane (II). The ring opened group generally retains the configuration of its antecedent halomethylene function.

In practicing the above ring opening process, the 19-acyloxy group is hydrolyzed to the corresponding free 19-alcohol. Thus, not only does this procedure provide ring opening but also concomitant hydrolysis of the 19-acyloxy moiety which eliminates subsequent base saponification procedures requiring prior 3-keto protection. A ring opened 3-keto-Δ⁴ derivative is thereby prepared which does not require further reaction before decarboxylation to give the 19-nor compound.

In this subsequent decarboxylation, the thus formed product is first oxidized via, for example, Jones conditiones affording the corresponding 10-carboxy derivative (III) followed by actual decarboxylation of the oxidation product (III) such as by heating with pyridine or strong acid in organic solvent to give the product 7-halomethyl-19-norandrost-4-ene-3,17-dione (IV).

The ring opened, 19-nor product (IV) of the present invention can be further and optionally elaborated at other parts of the molecule via methods known per se. This elaboration is performed principally at C-17 after prior selective protection of the 3-keto group, such as by forming the corresponding enol ether thereof by treatment with ethyl orthoformate in the presence of acid catalyst.

Thus, after such protection at C-3 the corresponding 17α-substituted-17β-hydroxy compounds are prepared via the use of organometallic reagents in a known manner, for example, by the use of Grignard reagents such as methylmagnesium bromide or using alkali metal alkynes such as lithium or potassium acetylide. Partial or complete hydrogenolysis of the thus obtained 17α-alkynyl derivatives affords the corresponding 17α-alkenyl and 17α-alkyl compounds respectively which are also available via the use of Grignard reagents. The 17α-haloalkynyl groups are similarly prepared via known methods.

In lieu of the above procedures, the 17-keto function can be reduced to give the 17-hydroxy compound unsubstituted in the 17α-position.

The 17β-hydroxyl functions thus provided are esterified and etherified by following conventional esterification and etherification procedures.

After such desired elaboration has taken place, the 3-keto group is restored through conventional hydrolysis. Alternatively to the 17-keto starting compounds hereof can be employed the corresponding compounds containing other elaboration at the C-17 position such as the corresponding 17β-ol-17β-acylates, 17β-ethers, 17α-aliphatic-17β-ols, -esters, and -ethers, and the like.

The intermediates used in preparing the 7-monohalomethyl- and 7-dihalomethyl-19-nor steroids according to the present invention, which intermediates are represented by Formulas I, II, and III above, are novel compounds per se. They can be generically represented as follows:

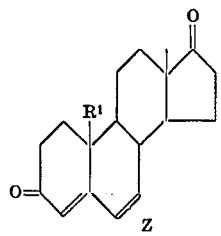

wherein $R^1$ is one of groups —$CH_2OAc$, —$CH_2OH$, and

in which Ac is acyl, preferably, acetyl;
Z is the group

attached to C-6 and C-7 or the group ....CHXY attached to C-7 in which X is hydrogen, chloro, or fluoro, and Y is chloro or fluoro provided that when $R^1$ is the group —$CH_2OAc$, Z is the group

attached to C-6 and C-7, and when $R^1$ is the group —$CH_2OH$ or

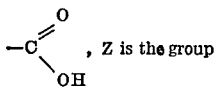, Z is the group

Z is the group ...CHXY attached to C-7. It will be understood that the various C-17 elaborated derivatives corresponding to the above depicted novel compounds are included within the scope thereof.

The novel process of the present invention, in addition to being useful for preparing 7-halomethyl derivatives of the 19-norandrostane steroid series, is also applicable for the preparation of the corresponding 7-halomethyl derivatives of the 19-norpregnane steroid series. Thus, for example, among other similar compounds, 7α-difluoromethyl-19-norpregn-4-ene-3,20-dione can be prepared.

The following examples illustrate the manner by which this invention can be practiced and are not to be construed as limitations upon the overall scope hereof but rather as illustrations hereof.

EXAMPLE 1

To a refluxing solution of 1 g. of 19-acetoxyandrosta-4,6-diene-3,17-dione in 10 ml. of bis(2-methoxyethyl) ether (diglyme) is added over a 2-hour period in a dropwise fashion with stirring a solution of 35 equivalents of sodium chlorodifluoroacetate in 40 ml. of diglyme. The mixture is refluxed until the U.V. spectrum indicates the disappearance of the 3-keto-Δ$^{4,6}$-diene system and is then filtered. The filtrate is evaporated to dryness and dissolved in methylene chloride. The organic solution is washed with water and then dried over sodium sulfate and evaporated to dryness. The residue is chromatographed on alumina eluting with methylene chloride to yield 6α,7α - difluoromethylene-19-acetoxyandrost-4-ene-3,17-dione.

By substituting sodium trichloroacetate and sodium chlorofluoroacetate in the above procedure of this example, there are respectively obtained 6α,7α-dichloromethylene-19-acetoxyandrost-4-ene-3,17-dione and 6α,7α-fluoromethylene-19-acetoxyandrost-4-ene-3,17-dione.

EXAMPLE 2

A solution of 5 g. of 6α,7α-difluoromethylene-19-acetoxyandrost-4-ene-3,17-dione in 200 ml. of ethanol and 300 ml. of isopropanol containing 70 ml. of a saturated ethanol solution of zinc-copper couple is refluxed with stirring for 4 days. The reaction mixture is then diluted with methylene chloride and washed with water. The organic solution is dried over sodium sulfate and evaporated to dryness giving a mixture of 7α-difluoromethylandrost-4-en-19-ol-3,17-dione and 7α-difluoromethyl-19-acetoxyandrost-4-ene-3,17-dione. The mixture is chromatographed on alumina eluting with benzene to separate 7α-difluoromethylandrost-4-en-19-ol-3,17-dione.

Similarly, both 7α-dichloromethylandrost-4-en-19-ol-3,17-dione and 7α-fluoromethylandrost-4-en-19-ol-3,17-dione are prepared from their respective 6,7-halocyclopropyl starting compounds.

In lieu of the use of zinc-copper couple in ethanol and isopropanol in the preceding procedure the following procedure can be employed.

A stirred solution of 1.6 g. of 6α,7α-difluoromethylene-19-acetoxyandrost-4-ene-3,17-dione in 25 ml. of acetic acid is heated at reflux for one hour with 5 portions of 500 mg. each of zinc dust. The mixture is then stirred at room temperature for one hour, filtered, the residue being washed with acetic acid and diluted with 10 ml. of water. This mixture is extracted with methylene chloride and the methylene chloride extracts are in turn, washed with water, 2 N sodium bicarbonate solution, and water. After drying this organic solution with magnesium sulfate, it is evaporated to dryness and chromatographed on alumina eluting with benzene to yield 7α-difluoromethylandrost-4-en-19-ol-3,17-dione.

EXAMPLE 3

To a stirred solution of 1 g. of 7α-difluoromethylandrost-4-en-19-ol-3,17-dione in 10 ml. of acetone, cooled to 0° C., is added under a nitrogen atmosphere a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and excess chromic acid destroyed by the addition of isopropyl alcohol. The solution is then separated under reduced pressure and the mixture diluted with water. The mixture is dissolved in methylene chloride, washed first with water and then with a 1% sodium hydroxide solution. The basic solution is acidified with 3 N hydrochloric acid, the crystalline 7α-difluoromethylandrost-4-ene-3,17-dion-19-oic acid filtered and dried.

In a like manner, 7α-dichloromethylandrost-4-ene-3,17-dion-19-oic acid and 7α-fluoromethylandrost-4-ene-3,17-dion-19-oic acid are prepared.

EXAMPLE 4

A mixture of 1.5 g. of 7α-difluoromethylandrost-4-ene-3,17-dion-19-oic acid, 75 ml. of methanol, and 2 ml. of concentrated hydrochloric acid was heated at steam bath temperatures for 30 minutes. It was then cooled and poured into ice water, the formed precipitate being filtered, washed, and dried. Upon crystallization from acetone:hexane there is obtained 7α-difluoromethyl-19-norandrost-4-ene-3,17-dione.

Similarly, 7α-dichloromethyl-19-norandrost-4-ene-3,17-dione and 7α-fluoromethyl-19-norandrost-4-ene-3,17-dione are prepared.

In lieu of the above procedure, the 10-carboxy derivative can be heated with pyridine to about 65° C. under a nitrorgen atmosphere followed by the addition of a few drops of 1 N hydrochloric acid in methanol solution at room temperature to give an identical product.

EXAMPLE 5

To a suspension of 1 g. of 7α-difluoromethyl-19-norandrost-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3 - ethoxy-7α-difluoromethyl-19-norandrosta-3,5(6)-dien-17-one which is recrystallized from acetone:hexane.

A solution of 1 g. of sodium borohydride in 3 ml. of water is added to an ice-cooled solution of 1 g. of 3-ethoxy - 7α - difluoromethyl-19-norandrosta-3,5(6)-dien-17-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3-ethoxy-7α-difluoromethyl-19-norandrosta-3,5,(6)-dien-17β-ol which may be further purified by recrystallization from acetone:hexane.

A mixture of 1 g. of 3-ethoxy-7α-difluoromethyl-19-norandrosta-3,5(6)-dien-17β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3-ethoxy-7α-difluoromethyl-17β-acetoxy - 19 - norandrosta-3,5(6)-diene which may be further purified through recrystallization from acetone:hexane.

In like manner, other 17β-acylates are prepared by use of alternative acylating agents in the preceding procedure to yield, for example, the corresponding 17β-benzoyloxy, 17β-adamantoyloxy, and 17β-propionyloxy derivatives.

A mixture of 0.5 g. of 3-ethoxy-7α-difluoromethyl-17β-acetoxy-19-norandrosta-3,5(6)-diene in 25 ml. of acetone and 0.1 ml. of concentrated hydrochloric acid is allowed to stand at room temperature for 15 hours and is then poured into water. This mixture is extracted with methylene chloride and the extracts are in turn washed with water to neutrality, dried over sodium sulfate and evaporated to dryness to yield 7α-difluoromethyl-17β-acetoxy-19-norandrost-4-en-3-one.

Similarly prepared by the procedures of this example are 7α - dichloromethyl-17β-acetoxy-19-norandrost-4-en-3-one and 7α - fluoromethyl-17β-acetoxy-19-norandrost-4-en-3-one.

EXAMPLE 6

A solution of 5 g. of 3-ethoxy-7α-difluoromethyl-19-norandrosta-3,5(6)-dien-17-one in 250 ml. of thiophene-free benzene is treated with 27.5 ml. of 4 N methylmagnesium bromide in anhydrous ether. The mixture is heated at reflux under anhydrous conditions for 3 hours, cooled and cautiously treated with excess aqueous ammonium chloride solution. This mixture is then extracted with ethyl acetate and these extracts are in turn washed with water, dried over sodium sulfate and evaporated to dryness to yield 3-ethoxy-17α-difluoromethyl-17α-methyl-19-norandrosta-3,5(6)-dien-17β-ol which is recrystallized from methylene chloride:hexane.

This compound is hydrolyzed with acid following the procedure set forth in the fifth paragraph of Example 5 to yield 7α-difluoromethyl-17α-methyl-19-norandrost-4-en-17β-ol-3-one.

Similar to the procedure of this example are prepared 7α-dichloromethyl - 17α - methyl-19-norandrost-4-en-17β-ol-3-one and 7α-fluoromethyl-17α-methyl-19-norandrost-4-en-17β-ol-3-one.

EXAMPLE 7

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of 3-ethoxy-7α - difluoromethyl-19-norandrosta-3,5(6)-dien-17-one in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane:ether to yield 3-ethoxy-7α-difluoromethyl-17α-chloroethynyl-19-norandrosta-3,5(6) - dien-17β-ol which may be recrystallized from methanol.

Acid hydrolysis by the method recited in Example 5 affords 7α - difluoromethyl-17α-chloroethynyl-19-norandrost-4-en-17β-ol-3-one.

By this procedure, 7α-dichloromethyl - 17α - chloroethynyl-19-norandrost-4-en-17β-ol-3-one and 7α-fluoromethyl-17α-chloroethynyl - 19 - norandrost-4-en-17β-ol-3-one are prepared.

EXAMPLE 8

A solution of 1 g. of 3-ethoxy-7α-difluoromethyl-19-norandrosta-3,5(6)-dien-17-one in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 3-ethoxy-7α-difluoromethyl-17α-ethynyl-19-norandrosta-3,5(6)-dien-17β-ol which is recrystallized from acetone:hexane.

Hydrolysis with acid yields 7α-difluoromethyl-17α-ethynyl-19-norandrost-4-en-17β-ol-3-one.

Similarly, 7α - dichloromethyl-17α-ethynyl-19-norandrost-4-en-17β-ol-3-one and 17α-fluoromethyl-17α-ethynyl-19-norandrost-4-en-17β-ol-3-one are prepared.

EXAMPLE 9

A mixture of 1 g. of 7α-difluoromethyl-17α-ethynyl-19-norandrost-4-en-17β-ol-3-one, 1 g. of p-toluenesulfonic acid monohydrate, 50 ml. of acetic acid and 25 ml. of acetic anhydride is allowed to stand at room temperature for 24 hours, and then is poured into water and stirred. This mixture is then extracted with methylene chloride and these extracts are dried and evaporated. The residue is then dissolved in 250 ml. of methanol containing 5 ml. of concentrated hydrochloric acid. After refluxing for one hour, the mixture is neutralized with an aqueous 10% solution of potassium bicarbonate and evaporated. The residue is extracted with methylene chloride, and the methylene chloride extract is washed with water to neutrality, dried and evaporated to yield 7α-difluoromethyl-17α-ethynyl-17β-acetoxy-19-norandrost-4-en-3-one which is recrystallized from acetone:ether.

Likewise, the other 17α-aliphatic-17β-ols of this invention are converted to the corresponding 17β-acetates.

A solution of 1 g. of 7α-difluoromethyl-17α-methyl-19-norandrost-4-en-17β-ol-3-one in 60 ml. of anhydrous ether is treated with 7.5 molar equivalents of ethyl magnesium bromide in ether and, after a few minutes, with 7.5 molar equivalents of adamantoyl chloride. The mixture is allowed to stand at room temperature for 15 hours, then diluted with water, and extracted with methylene chloride. The extracts are washed with water to neutrality, dried and evaporated. The residue is chromatographed on neutral alumina, eluting with ether:hexane to yield 7α-difluoromethyl - 17α - methyl-17β-adamantoyloxy-19-norandrost-4-en-3-one which is recrystallized from acetone:hexane.

Upon substitution of an alternative acid chloride, in lieu of adamantoyl chloride in the immediately preceding paragraph, the corresponding 17α-aliphatic-17β-acylates are prepared. Thus, for example, 7α-difluoromethyl-17α-methyl-17β-acetoxy-19-norandrost-4-en-3-one,
7α-dichloromethyl-17α-methyl-17β-acetoxy-19-norandrost-4-en-3-one,
7α-fluoromethyl-17α-methyl-17β-acetoxy-19-norandrost-4-en-3-one,
7α-difluoromethyl-17α-ethyl-17β-acetoxy-19-norandrost-4-en-3-one,
7α-difluoromethyl-17α-chloroethynyl-17β-acetoxy-19-norandrost-4-en-3-one,
7α-dichloromethyl-17α-chloroethynyl-17β-acetoxy-19-norandrost-4-en-3-one,
7α-fluoromethyl-17α-chloroethynyl-17β-acetoxy-19-norandrost-4-en-3-one,
7α-difluoromethyl-17α-ethynyl-17β-propionyloxy-19-norandrost-4-en-3-one,
7α-dichloromethyl-17α-ethynyl-17β-propionyloxy-19-norandrost-4-en-3-one,
7α-fluoromethyl-17α-ethynyl-17β-propionyloxy-19-norandrost-4-en-3-one,
7α-difluoromethyl-17α-methyl-17β-benzoyloxy-19-norandrost-4-en-3-one,
7α-difluoromethyl-17α-ethynyl-17β-adamantoyloxy-19-norandrost-4-en-3-one,
7α-dichloromethyl-17α-ethynyl-17β-adamantoyloxy-19-norandrost-4-en-3-one,
7α-difluoromethyl-17α-ethyl-17β-(3-phenylpropionyloxy)-19-norandrost-4-en-3-one,
7α-fluoromethyl-17α-methyl-17β-decanoyloxy-19-norandrost-4-en-3-one,
7α-difluoromethyl-17α-methyl-17β-dichloroacetoxy-19-norandrost-4-en-3-one,
7α-dichloromethyl-17α-ethynyl-17β-dichloroacetoxy-19-norandrost-4-en-3-one,
7α-fluoromethyl-17α-ethynyl-17β-dichloroacetoxy-19-norandrost-4-en-3-one, and the like are prepared.

EXAMPLE 10

A solution of 1 g. of 3-ethoxy-7α-difluoromethyl-17α-ethynyl-19-norandrosta-3,5(6)-dien-17β-ol in 40 ml. of pyridine is hydrogenated at 25° C. atmospheric pressure in the presence of 0.4 g. of Lindlar catalyst. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 3-ethoxy-7α-difluoromethyl-17α-vinyl-19-norandrosta-3,5(6)-dien-17β-ol which is further purified through recrystallization from acetone.

Acid hydrolysis yields 7α-difluoromethyl-17α-vinyl-19-norandrost-4-en-17β-ol-3-one.

Similarly, 7α - dichloromethyl-17α-vinyl-19-norandrost-4-en-17β-ol-3-one and 7α-fluoromethyl-17α-vinyl-19-norandrost-4-en-17β-ol-3-one are prepared.

EXAMPLE 11

A solution of 3 g. of 3-ethoxy-7α-difluoromethyl-17α-ethynyl-19-norandrosta-3,5(6)-dien-17β-ol in 125 ml. of dioxane is hydrogenated at 25° C./570 mm. with 0.5 g. of prehydrogenated 10% palladium-on-charcoal. Upon the consumption of the theoretical amount of hydrogen, the solution is filtered and the filtrate evaporated to dryness under reduced pressure to yield 3-ethoxy-7α-difluoromethyl-17α-ethyl-19 - norandrosta - 3,5(6) - dien - 17β - ol which is recrystallized from acetone.

Acid hydrolysis gives 7α-difluoromethyl-17α-ethyl-19-norandrost-4-en-17β-ol-3-one.

Similarly, 7α-dichloromethyl-17α-ethyl-19-norandrost-4-en-17β-ol-3-one and 7α-fluoromethyl-17α-ethyl-19-norandrost-4-en-17β-ol-3-one are prepared.

Alternatively, the procedures outlined in Examples 5 through 11 above can be performed prior to the novel process procedures hereof utilizing the 17-keto starting compound to prepare identical products.

What is claimed is:
1. A process for the preparation of a compound selected from the group consisting of a 3-keto-7-monohalomethyl-19-nor-$\Delta^4$ steroid and a 3-keto-7-dihalomethyl-19-nor-$\Delta^4$ steroid, said steroids being of the androstane class, which comprises:
 (a) treating a 3-keto-19-acetoxy-$\Delta^{4,6}$ steroid with an alkali or alkaline earth metal salt of a dihalo- or trihaloacetic acid to give the corresponding 3-keto-6,7-monohalomethylene-19-acetoxy-$\Delta^4$ or 3-keto-6,7-dihalomethylene-19-acetoxy-$\Delta^4$ steroid;
 (b) treating the 6,7-halomethylene steroid with a ring opening reagent selected from zinc dust and zinc-copper metal couple in an inert solvent to cleave the halomethylene group and give the corresponding 3-keto-7-monohalomethyl-19-hydroxy-$\Delta^4$ or 3-keto-7-dihalomethyl-19-hydroxy-$\Delta^4$ steroid;
 (c) oxidizing the 7-halomethyl steroid with chromic acid to the 3-keto-7-monohalomethyl-10-carboxy-$\Delta^4$ or 3-keto-7-dihalomethyl-10-carboxy-$\Delta^4$ steroid; and
 (d) decarboxylating the 10-carboxy steroid by heating with pyridine or strong acid in organic solvent to the product 3-keto-7-monohalomethyl-19-nor-$\Delta^4$ or 3-keto-7-dihalomethyl-19-nor-$\Delta^4$ steroid.

2. The process according to claim 1 wherein:
in part (a) thereof, the halo acid is one represented by the formula:

W—CXY—COOH in which W is chloro, iodo or bromo, X is hydrogen, chloro or fluoro and Y is chloro or fluoro and the treatment is conducted in inert non-aqueous solvent at a temperature above the decomposition temperature of the salt employed;

in part (b) thereof, the inert solvent is an organic alcohol; and in part (d) thereof, the decarboxylation is conducted with hydrochloric acid.

3. The process according to claim 1 wherein the ring opening reagent is zinc-copper couple and the inert solvent is ethanol and isopropanol.

4. The process according to claim 1 wherein the ring opening reagent is zinc dust and the inert solvent is acetic acid.

5. The process according to claim 1 wherein the starting steroid is 19-acetoxyandrosta-4,6-diene-3,17-dione, the salt of the haloacid is sodium chlorodifluoroacetate, and the product steroid is 7α-difluoromethyl-19-norandrost-4-ene-3,17-dione.

6. The process according to claim 1 wherein the starting steroid is 19-acetoxyandrosta-4,6-diene-3,17-dione, the salt of the haloacid is sodium trichloroacetate, and the product steroid is 7α-difluoromethyl-19-norandrost-4-ene-3,17-dione.

7. The process according to claim 1 wherein the starting steroid is 19-acetoxyandrosta-4,6-diene-3,17-dione, the salt of the haloacid is sodium chlorofluoroacetate, and the product steroid is 7α-difluoromethyl-19-norandrost-4-ene-3,17-dione.

8. A compound of the formula

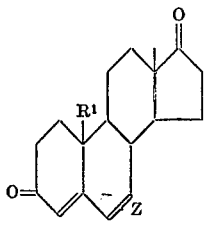

wherein:
$R^1$ is one of groups —$CH_2OAc$, —$CH_2OH$, or

in which Ac is acetyl;
Z is the group

attached to C-6 and C-7 or the group . . . CHXY attached to C-7 in which X is hydrogen, chloro, or fluoro and Y is chloro or fluoro, provided that when $R^1$ is the group —$CH_2OAc$, Z is the group

attached to C-6 and C-7 and when $R^1$ is the group —$CH_2OH$ or

Z is the group . . . CHXY attached to C-7.

9. A compound according to claim 8 wherein $R^1$ is the group —$CH_2OAc$ in which Ac is acetyl and Z is the group

attached to C-6 and C-7 in which Z is hydrogen, chloro, or fluoro and Y is chloro or fluoro.

10. A compound according to claim 8 wherein $R^1$ is the group —$CH_2OH$ and Z is the group . . . CHXY attached to C-7 in which X is hydrogen, chloro, or fluoro and Y is chloro or fluoro.

11. A compound according to claim 8 wherein $R^1$ is the group —$CH_2OH$ and Z is the group . . . $CHF_2$ attached to C-7.

References Cited
UNITED STATES PATENTS 3,047,566   7/1962   Godtfredsen et al.

HENRY A. FRENCH, Primary Examiner

U.S. Cl. X.R.

260—397.1, 397.4, 397.5, 999

UNITED STATES PATENT OFFICE
CERTIFICATE OF CORRECTION

Patent No. 3,472,882          Dated    October 14, 1969

Inventor(s) Belig Berkoz

It is certified that error appears in the above-identified patent and that said Letters Patent are hereby corrected as shown below:

Column 1, line 37, "holcyclo-" should read --halocyclo- --.

Column 1, lines 58 through 72, Formulas (I) and (II) should appear as follows:

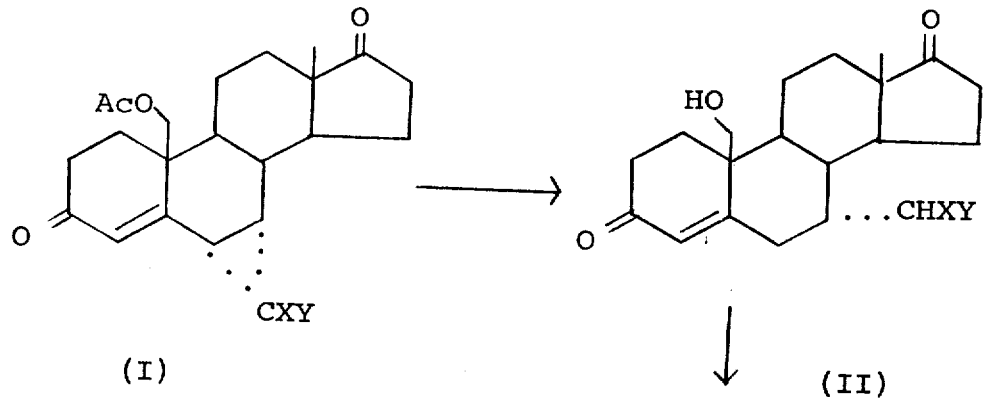

Column 3, line 20, "17" should read --17β--.

Column 3, line 72, cancel "Z is the group".

Column 5, line 27, cancel "nitrorgen" and replace with --nitrogen--.

UNITED STATES PATENT OFFICE
CERTIFICATE OF CORRECTION

Patent No. 3,472,882            Dated    October 14, 1969

Inventor(s)    Belig Berkoz

It is certified that error appears in the above-identified patent and that said Letters Patent are hereby corrected as shown below:

Column 6, line 16, cancel "17α" (first occurrence) and replace with --7α--.

Column 9, line 15, cancel "-difluoromethyl" and replace with -- -dichloromethyl--.

Column 9, line 20, cancel "difluoromethyl" and replace with --fluoromethyl--.

Signed and sealed this 10th day of November 1970.

(SEAL)
Attest:

EDWARD M. FLETCHER, JR.
Attesting Officer

WILLIAM E. SCHUYLER, JR.
Commissioner of Patents